United States Patent [19]

Tomori

[11] 4,304,463

[45] Dec. 8, 1981

[54] LENS BARREL AUTOMATIC FOCALIZATION DEVICE

[75] Inventor: Yasumasa Tomori, Sakado, Japan

[73] Assignee: Asahi Kogaku Kogyo Kabushiki Kaisha, Tokyo, Japan

[21] Appl. No.: 102,072

[22] Filed: Dec. 10, 1979

[30] Foreign Application Priority Data

Jan. 11, 1979 [JP] Japan .................................. 54/1927

[51] Int. Cl.³ ............................................. G02B 7/11
[52] U.S. Cl. .................................................. 350/255
[58] Field of Search ................. 350/255, 243, 257, 253

[56] References Cited

U.S. PATENT DOCUMENTS

| | | | |
|---|---|---|---|
| 2,500,050 | 3/1950 | Wittel | 350/255 |
| 3,389,636 | 6/1968 | Weitzner et al. | 350/243 |
| 3,529,525 | 9/1970 | Yamashita | 350/257 |
| 3,773,405 | 11/1973 | Sugano | 350/255 |

*Primary Examiner*—William H. Punter
*Attorney, Agent, or Firm*—Sughrue, Mion, Zinn, Mackpeak & Seas

[57] ABSTRACT

A lens barrel automatic focalization device for a camera in which the camera body furnishes a focalization operational force in which the rotational resistance force produced by the focalization operation is made constant over various lenses so that the response time of the focalization operation is made uniform. The camera body includes a mount and a rotary member rotatably mounted on the camera body on a shaft perpendicular to the optical axis of the camera at the lower center portion of the mount. The focalization device includes a rotary member positioned so as to be rotatable by the rotary member of the camera body with the rotational force of the rotary member being coupled to a rotary cylinder having threads engaged with the threads of a movable sleeve or cylinder. The rotary cylinder is mounted within a stationary cylinder with ball bearings being provided therebetween. Rotational movement of the movable cylinder is restrained by a regulating cylinder fixed to the supporting cylinder and having guide pins which extend into corresponding longitudinal guide slots on the outer surface of the moving cylinder.

4 Claims, 3 Drawing Figures

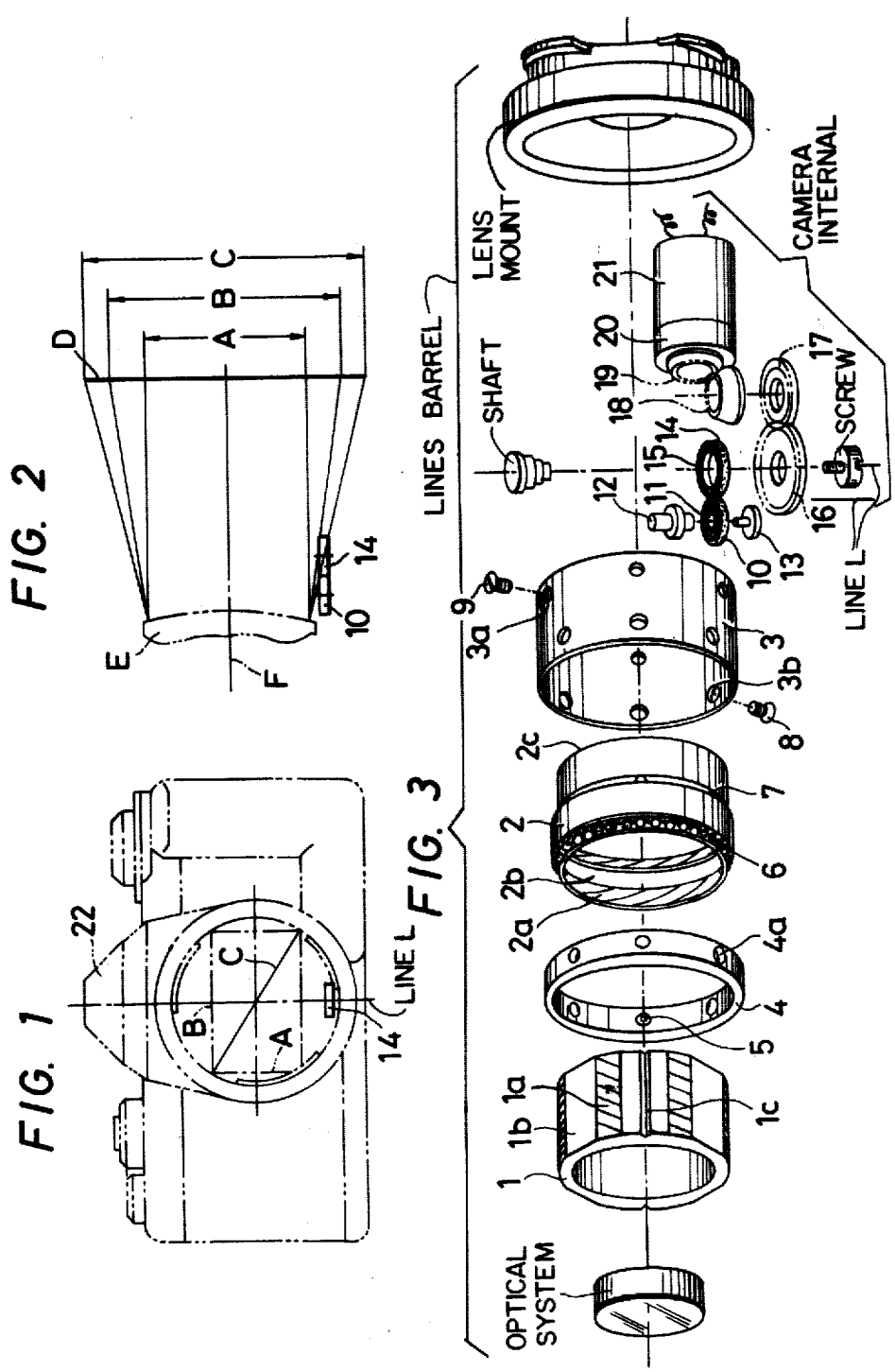

LENS BARREL AUTOMATIC FOCALIZATION DEVICE

BACKGROUND OF THE INVENTION

The present invention relates to a device which is provided for an interchangeable lens barrel whose focalization operation is automatically controlled through the camera body.

In order to automatically carry out lens focalization a variety of devices have been proposed in the art which, for instance, are provided either outside of the lens barrel or integral with the camera. However, the conventional devices have not been found suitable for cameras which use interchangeable lenses as they require a relatively great focalizing force and accordingly are bulky in construction. Additionally the rotational resistance force involved in the focalizing operation is not uniform among different lenses.

In order to alleviate these problems an object of the invention is to provide a lens barrel automatic focalization device in which a drive force transferring means which receives a focalizing operation force from a camera body is disposed at a position in the mount adapted to permit a lens barrel to engage with the camera body. It is desired that the device only minimally interfere with the optical paths of the optical system and that the rotational resistance force which is generated in the focalizing operation and is variable with different lenses is controlled so as to make uniform the response time of the focalizing operation. It is also desireable that the automatic focalization device be suitable for miniaturizing the drive source in the camera.

SUMMARY OF THE INVENTION

Accordingly, the primary and other objects of the present invention are met by a lens barrel automatic focalization device for a camera in which the camera body thereof produces a focalizing operational force with a rotary member for transfering the focalizing operational force rotatably mounted on the camera body on a rotary shaft which is perpendicular to the optical axis of the camera and which is disposed in the vicinity of an extension of a line connecting the centers of the long sides of an image viewed through the lens in a mount adapted to permit the lens barrel to engage with the camera body. In accordance with the invention, there is provided a lens mount, a supporting cylinder fixedly secured to the lens mount, a rotary member rotatably mounted on the lens mount which is adapted to be rotated by the rotary member of the camera body, a movable cylinder which is movable along the optical axis in accordance with movement of the rotary member, a rotary cylinder having one end face thereof formed with threads which are adapted to be engaged with threads formed on the movable cylinder, the rotary cylinder being supported rotatably around the optical axis by the supporting cylinder.

Further in accordance with the invention, a plurality of male-threaded portions of the movable cylinder are cut away to form a plurality of surfaces each having a longitudinal axis disposed parallel to the optical axis and with a central portion of a female-threaded portion of the rotary cylinder cut away to form a cylindrical surface. The rotary cylinder, in preferred embodiments, is supported rotatably around the optical axis of the supporting cylinder by ball bearing members. The ball bearing members are provided in two sets of balls disposed respectively at forward and center portions of the rotary cylinder. There is preferably also provided a regulating cylinder which is mounted to the supporting cylinder with at least one guide pin extending from the regulating cylinder. Each of the guide pins is positioned in a corresponding longitudinal groove on the outer surface of the movable cylinder thereby to prevent its rotation.

BRIEF DESCRIPTION OF THE DRAWINGS

FIG. 1 is an explanatory diagram showing the positions of a drive force rotary member with a camera body indicated by phantom lines;

FIG. 2 is a diagram showing the positional relation of a drive force transferring rotary member and a drive force rotary member with respect to the optical paths of an optical system; and FIG. 3 is an exploded perspective view showing a preferred embodiment of the invention.

DESCRIPTION OF THE PREFERRED EMBODIMENTS

An automatic focalization device constructed according to the invention will be described with reference to the accompanying drawings. In FIG. 3, reference numerals 1-12 designate components of a lens barrel. Reference numeral 1 designates a movable cylinder which is adapted to hold an optical system and is movable along the optical axis by means of threads 1a and 2a guided by guide pins 5 and straight grooves 1c which are parallel to the optical axis. Reference numeral 2 designates a rotary cylinder which has threads 2a engaged with the threads 1a and a sleeve part 2c cooperates with a drive force transferring rotary member 10 which receives a focalizing operational force from a drive rotary member 14 which is provided in a camera body 22.

In order to decrease the rotational resistance force between the threads 1a and 2a in the focalizing operation, several portions of the region of the movable cylinder 1 where the threads 1a have been formed are cut away in such a manner that plural surfaces 1b, which have a longitudinal axis parallel to the optical axis, are formed at equal intervals. The surfaces 1b may if desired be trapezoidal in shape. Also, the central portion of the region of the rotary cylinder 2 where the threads 2a have been formed is cut away to form a cylindrical portion 2b. That is, only a necessary minimum contact area through the threads is provided between the two cylinders although the overall thread engaging length is retained. Accordingly, it is possible to reduce the size of the drive source which is provided in the camera body 22. Furthermore, as the rotational resistance force which is provided during the focalization operation and which varies in accordance with the optical system in the lens barrel can be controlled by suitably adjusting the size of the surfaces 1b and the cylindrical portion 2b, the response time of the focalization operation can be made uniform.

Reference numeral 3 designates a supporting cylinder which supports the rotary cylinder 2 rotatably around the optical axis and which in turn is held integrally by a lens mount which connects to the mounting surface of the camera body (FIG. 1) in a well-known manner. Reference numeral 4 designates a regulating cylinder which is fixedly secured to the supporting cylinder 3 by means of a fixing screw 8 which is inserted into the hole 3b of the supporting cylinder 3 and screwed into the tapped hole 4a of the regulating cylinder. Movement straight along the axis of the rotary cylinder 2 is thus maintained when the rotary cylinder 2 is rotatably supported by the supporting cylinder 3.

In order to decrease the frictional force which is generated when the rotary cylinder 2 is turned, the rotary cylinder 2 is held by balls 6 provided between the inner wall of the supporting cylinder 3 and the end face of the regulating cylinder 4 and the rotation of the rotary cylinder 2 is made adjustable by means of an adjusting screw 9 and with the aid of balls 7 which are rotatably inserted in the supporting cylinder 3. This also makes compact the drive source provided in the camera body and makes uniform the focalization response speeds for interchangeable lenses as the rotational resistance force which is generated in the focalization operation is varied.

The aforementioned drive force transferring rotary member 10 is adapted to transfer the focalizing operation force from the camera body 22 as described before. It is made of an elastic material having a suitable hardness. The drive force transferring rotary member 10 is formed integrally with a bearing 11. The drive force transferring rotary member 10 may also be provided with teeth in the form of a gear in which case the teeth should be formed so as to correspond with those 2c of the rotary cylinder 2. The drive force transferring rotary member is rotatably mounted on a shaft 12 by a screw 13. All of components 1–12 and the lens mount comprise the lens barrel.

Reference numeral 14 designates a drive force rotary member which is provided in the camera body 22. The drive force rotary member 14 is made of an elastic material having a suitable hardness and constructed integrally with a bearing 15. In the case where the drive force transferring rotary member 10 is provided with teeth in the form of a gear, the drive force rotary member 14 should have corresponding teeth. The drive force rotary member 14 is rotatably mounted in the camera body 22 upon a rotary shaft so that the drive force rotary member 14 and a gear 16 are rotated as one unit. Furthermore, a gear 17 engaging the gear 16 and a gear 18 are also mounted in the camera body 22 upon a second rotary shaft (not shown) so that the gears 17 and 18 are rotated as one unit. A gear 19 is so arranged that it is coaxial with a gear head 20 and a motor 21 and is engaged with the gear 18.

The preferred arrangement of the drive force transferring rotary member 10 of the lens barrel and the drive force rotary member 14 of the camera body in the mount will be described. With reference to FIG. 1, the drive force rotary member 14 is rotatably mounted on a rotary shaft (not shown) at the lower portion of the mount of the camera body 22, the rotary shaft being perpendicular to the optical axis. Referring back to FIG. 3, in association with the drive force rotary member 14, the drive force transferring rotary member 10 is mounted on the shaft 12 in the lens barrel mount section with the shaft 12 perpendicular to the optical axis. That is, these rotary shafts are positioned on the extension of a line (L in FIGS. 2 and 3) connecting the centers of the long sides of a picture.

The optical paths extending from an optical system E (only the last component thereof shown) to the short side A, the long side B and the diagonal line C of an image on an image forming plane D (or an image plane) are, in general, as shown in FIG. 2. As the drive force transferring rotary member 10 and the drive force rotary member 14 are so arranged that they do not interfere with the optical path extending to the short side, very little interference occurs with various optical systems. That is, the position of the rotary member 10 and 14 makes possible the use of the invention with nearly all interchangeable lenses. It goes without saying that, depending on the arrangement of the optical system of an interchangeable lens, it is not always necessary to position the rotary shafts of the drive force transferring rotary shaft 10 and the drive force rotary shaft 14 on the extension at the mount side of the lines connecting the centers of the long sides of the picture. That is, the rotary shafts may be positioned at points which are closer to the center of the long side and, on the extension, toward the mount side, of the line.

The focalization operation with the invention will be described. When an instruction signal is outputted by a focalization detecting device (not shown) in the camera body 22, the motor 21 is rotated in a direction as specified to generate a focalizing operational force. The rotation of the motor 21 is transmitted through the gear head 20 and the train of gears 19, 18, 17 and 16 to the drive force rotary body 14. As a result, the drive force rotary body 14 is rotated in the specified direction. The rotation of the drive force rotary body 14 is transmitted to the drive force transferring rotary member 10 to rotate the rotary cylinder 2. In this case, although the threads 1a are engaged with the threads 2a, rotation of the movable cylinder 1 is restrained by the guide pins 5 and the grooves 1c. Accordingly, the movable cylinder 1 is displaced along the optical axis to the correct focalization position.

As is apparent from the above description, in the device according to the invention, the focalization operation force transferring means is provided at the position in the mount adapted to engage and disengage the lens from the camera body where it interferes very little with the optical paths of the optical system. Therefore, the device according to the invention can be applied to various optical systems, specifically, various interchangeable lenses. Furthermore, the rotational resistance force which is generated in the focalization operation is minimized. The size of the drive source in the camera body can be decreased over that required for use with prior art systems. In addition, the resistance force which is caused by the lens barrel during a focalization operation is made constant and accordingly the response time of the focalization operation is made uniform.

What is claimed is:

1. A lens barrel automatic focalization device for a camera including means in the camera body for producing a focalizing operational force, said device comprising: a first rotary member (14) for transferring said focalizing operational force to a lens barrel, said first rotary member rotatably mounted on said camera body on a shaft having an axis which is perpendicular to the optical axis of said camera and disposed in the vicinity of an extension of a line connecting the centers of the long sides of an image, a lens mount, a supporting cylinder fixedly secured to said mount, a second rotary member (10) rotatably mounted on said mount and being adapted to be rotated by said first rotary member on said camera body, a movable cylinder movable along the optical axis in accordance with movement of said second rotary member, and a rotary cylinder having one face with threads engaged with threads formed on said movable cylinder, said rotary cylinder being supported rotatably around the optical axis by said supporting cylinder.

2. A lens barrel automatic focalization device as claimed in claim 1 wherein a plurality of a male-threaded portions of said movable cylinder are cut away to form a plurality of surfaces having a longitudinal axis parallel to the optical axis, and wherein a central portion of a female-threaded portion of said rotary cylinder is cut away to form a cylindrical surface, said rotary cylinder being supported rotatably around the optical axis of said supporting cylinder by ball bearing members.

3. The lens barrel automatic focalization device of claim 2 wherein said ball bearing members are provided in two sets of balls disposed respectively at forward and center portions of said rotary cylinder.

4. The lens barrel automatic focalization device of any of claims 1 to 3 further comprising a regulating cylinder mounted on said supporting cylinder, said regulating cylinder having at least one guide pin extending from said regulating cylinder, said at least one guide pin being positioned in a corresponding longitudinal groove on the outer surface of said movable cylinder.

* * * * *